United States Patent
Wilkins et al.

(10) Patent No.: US 10,295,044 B2
(45) Date of Patent: May 21, 2019

(54) BRACE FOR POWERPLANT

(71) Applicant: FORD GLOBAL TECHNOLOGIES, LLC, Dearborn, MI (US)

(72) Inventors: Marc Thomas Wilkins, Farmington Hills, MI (US); Chris Peter Nicholas, Milford, MI (US); Anthony Paskus, Rochester Hills, MI (US); Brian Christian Orr, Macomb, MI (US); Andrew Brian Lovatt, Novi, MI (US); William David Guarino, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 217 days.

(21) Appl. No.: 15/291,489

(22) Filed: Oct. 12, 2016

(65) Prior Publication Data
US 2018/0100574 A1      Apr. 12, 2018

(51) Int. Cl.
| F16H 57/12 | (2006.01) |
| F16H 57/03 | (2012.01) |
| F16H 1/22  | (2006.01) |
| B60K 17/344 | (2006.01) |

(52) U.S. Cl.
CPC .............. *F16H 57/03* (2013.01); *F16H 1/22* (2013.01); *F16H 57/12* (2013.01); *B60K 17/344* (2013.01)

(58) Field of Classification Search
CPC . F16H 57/03; F16H 1/22; F16H 57/12; B60K 17/344
See application file for complete search history.

(56) References Cited

U.S. PATENT DOCUMENTS

| 4,216,840 | A |   | 8/1980  | Dick |   |
|---|---|---|---|---|---|
| 4,779,701 | A | * | 10/1988 | Tsuchiya | B60K 5/04 |
|           |   |   |         |          | 180/292   |
| 5,042,321 | A | * | 8/1991  | Hongo    | B60K 17/00 |
|           |   |   |         |          | 74/467    |
| 5,070,830 | A | * | 12/1991 | Malven   | B60K 17/00 |
|           |   |   |         |          | 123/195 A |
| 5,495,905 | A |   | 3/1996  | Fini, Jr. |   |
| 5,868,078 | A |   | 2/1999  | Madison  |   |
| 7,722,063 | B2 |  | 5/2010  | Dieziger |   |
| 8,215,444 | B2 | * | 7/2012 | Fsadni   | F16H 57/025 |
|           |   |   |         |          | 180/299   |
| 2007/0155572 | A1 |   | 7/2007 | Sugano |   |
| 2015/0283891 | A1 | * | 10/2015 | Sykes  | B60K 5/1241 |
|              |    |   |         |        | 180/300     |

* cited by examiner

*Primary Examiner* — Vicky A Johnson
(74) *Attorney, Agent, or Firm* — David Kelley; Brooks Kushman, P.C.

(57) ABSTRACT

A powertrain includes a transmission case, a transfer case, a front axle housing, and a webbed brace. The transfer case and front axle housing are directly fastened to the transmission case. The webbed brace is directly fastened to the transmission case, the transfer case, and the front axle housing to form a powerplant system. The webbed brace is configured such that a bending frequency of the powerplant system falls within a predefined range.

19 Claims, 5 Drawing Sheets

BRACE FOR POWERPLANT

TECHNICAL FIELD

The present disclosure generally relates to a powertrain of a vehicle with all-wheel drive capability.

BACKGROUND

The elements of a powertrain of a vehicle experience various forces and moments, which may cause noise and vibration, due to the torque generated and transferred throughout the powertrain. It may be desirable to decrease noise, vibration, and harshness (NVH) so that the driver has a better driving experience and the various joints throughout the powertrain experience less fatigue. Moreover, for vehicle applications in which a front axle is mounted more rearward in the vehicle (e.g., adjacent the transmission case), it may be desirable to mount the front axle (with its housing) to a powertrain element(s) that is strong enough to support the front axle.

SUMMARY

According to one embodiment, a powertrain includes a transmission case, a transfer case, a front axle housing, and a webbed brace. The transfer case and front axle housing are directly fastened to the transmission case. The webbed brace is directly fastened to the transmission case, the transfer case, and the front axle housing to form a powerplant system. The webbed brace is configured such that a bending frequency of the powerplant system falls within a predefined range.

According to another embodiment, a powertrain includes a transmission case, a transfer case, and a brace. The transfer case is directly fastened to the transmission case. The brace is directly fastened to the transmission case and the transfer case to form a powerplant system. The brace has a predefined form such that a bending frequency of the powerplant system falls within a predefined range.

According to another embodiment, a powertrain includes a transmission case, a transfer case, a front axle housing, and a brace. The transfer case and front axle housing are directly fastened to the transmission case. The brace is directly fastened to the transmission case, the transfer case, and the front axle housing to increase a stiffness and a frequency of the powertrain.

DETAILED DESCRIPTION

As required, detailed embodiments of the present disclosure are disclosed herein; however, it is to be understood that the disclosed embodiments are merely exemplary of the disclosure that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present disclosure.

Figure 1:
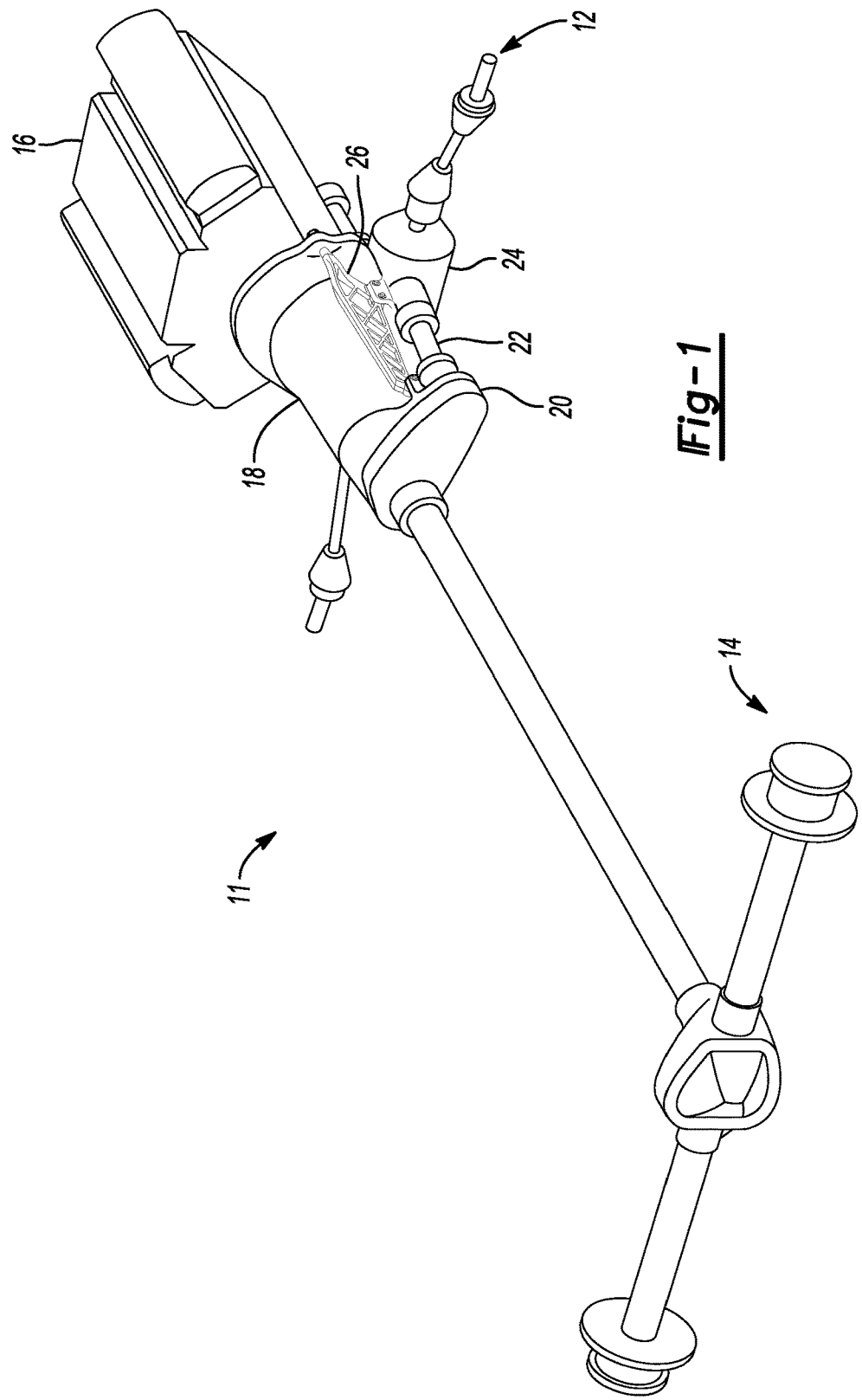
FIG. 1 is an isometric view of an all-wheel-drive (AWD) powertrain with a front axle and a rear axle.

FIG. 1 is an isometric view of an AWD powertrain 11 with a front axle 12 and a rear axle 14. Powertrain 11 may include an engine 16 configured to generate power, a transmission 18 coupled to engine 16 and configured to transmit power from engine 16, a transfer case 20 configured to distribute power from transmission 18 to front axle 12 and rear axle 14, a front drive shaft 22, a front axle housing 24, and a brace 26.

Figure 2:
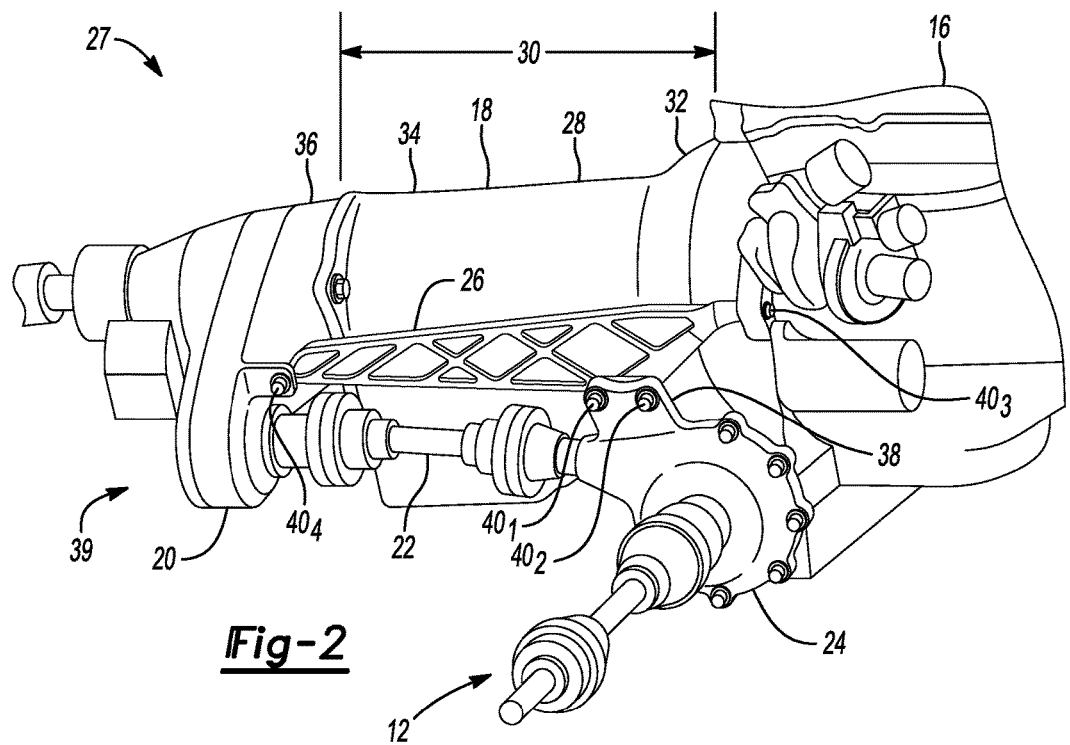
FIG. 2 is an isometric view of a subassembly of the powertrain of FIG. 1.
Figure 3:
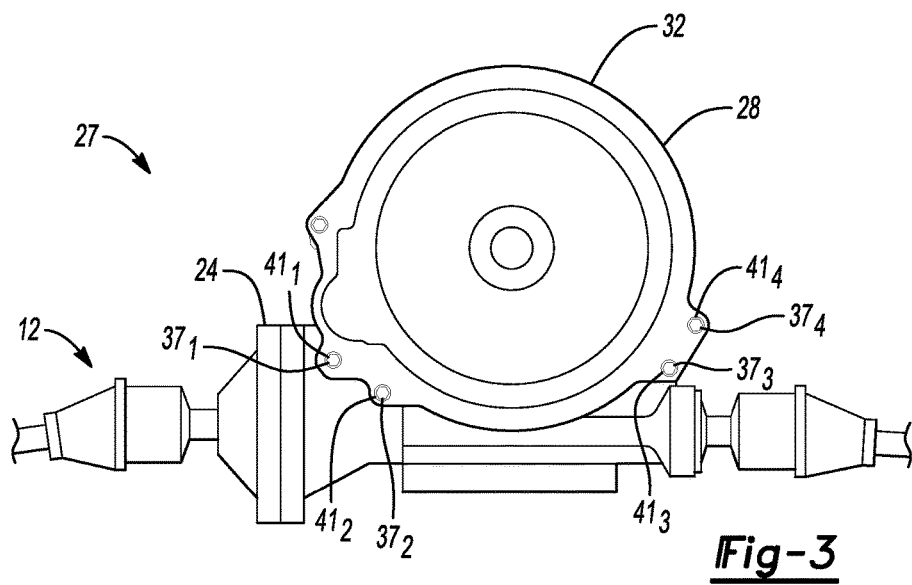
FIG. 3 is a front elevational view of the subassembly of FIG. 2.

FIG. 2 is an isometric view of a subassembly 27 of the powertrain 11 of FIG. 1. FIG. 3 is a front elevational view of the subassembly 27 of FIG. 2. Referring specifically to FIG. 2, transmission 18 may include a transmission case 28 to contain the various parts of transmission 18. In the illustrated embodiment, transmission case 28 has a length 30 and includes a bell housing 32 and a rear portion 34 opposite bell housing 32. Bell housing 32 may be coupled to engine 16, and rear portion 34 may be coupled to a front portion 36 of transfer case 20. In an embodiment, transfer case 20 may be directly fastened to transmission case 28. Front drive shaft 22 may be configured to transmit power from transfer case 20 to front axle 12 via a front axle differential contained within front axle housing 24. Front drive shaft 22 may be coupled to transfer case 20 and extend generally from transfer case 20 to front axle housing 24. Front axle housing 24 may be configured to support front axle 12. In the illustrated embodiment (and as best shown in FIG. 3), front axle 12 and front axle housing 24 are positioned proximate bell housing 32 of transmission case 28, and front axle housing 24 extends laterally underneath transmission case 28. Such an arrangement may be desired for improved packaging of the front axle and better alignment of driveline angles. In other embodiments, the front axle may be disposed more forward of the transmission and mounted to the front suspension or chassis. In such embodiments, the brace may not be directly fastened to the front axle housing; instead, the brace may be directly fastened to the transfer case and transmission case to form the powerplant system. In the illustrated embodiment, front axle housing 24 is coupled to transmission case 28 at transmission mounting points $37_1$, $37_2$, $37_3$, $37_4$. Specifically, front axle housing 24 may be directly fastened to transmission case 28.

Referring to FIG. 2, front axle housing 24 may also be coupled to brace 26 and may include a mounting flange 38 to which brace 26 may be mounted at intermediate mounting points $40_1$, $40_2$. As such, brace 26 may be directly fastened to transmission case 28, transfer case 20, and front axle housing 24 to form a powerplant system 39. Brace 26 may be mounted to transmission case 28 and transfer case 20 at a front mounting point $40_3$ and a rear mounting point $40_4$, respectively. Moreover, brace 26 may be positioned laterally of transmission case 28 and span a majority of length 30 of transmission case 28. Brace 26, as shown, may be positioned adjacent front drive shaft 22 and may maintain proper alignment between front axle 12 and front drive shaft 22.

Referring to FIG. 3, transmission mounting points $37_1$, $37_2$, $37_3$, $37_4$ and intermediate mounting points $40_1$, $40_2$ (FIG. 2) may be in the form of through-holes through which bolts $41_1$, $41_2$, $41_3$, $41_4$ and $42_1$, $42_2$ (respectively) may extend. One of ordinary skill in the art will understand that brace 26 may be mounted to front axle housing 24 in a number of ways at one or more places. Moreover, the mounting points may be various sizes and/or configurations.

Figure 4:
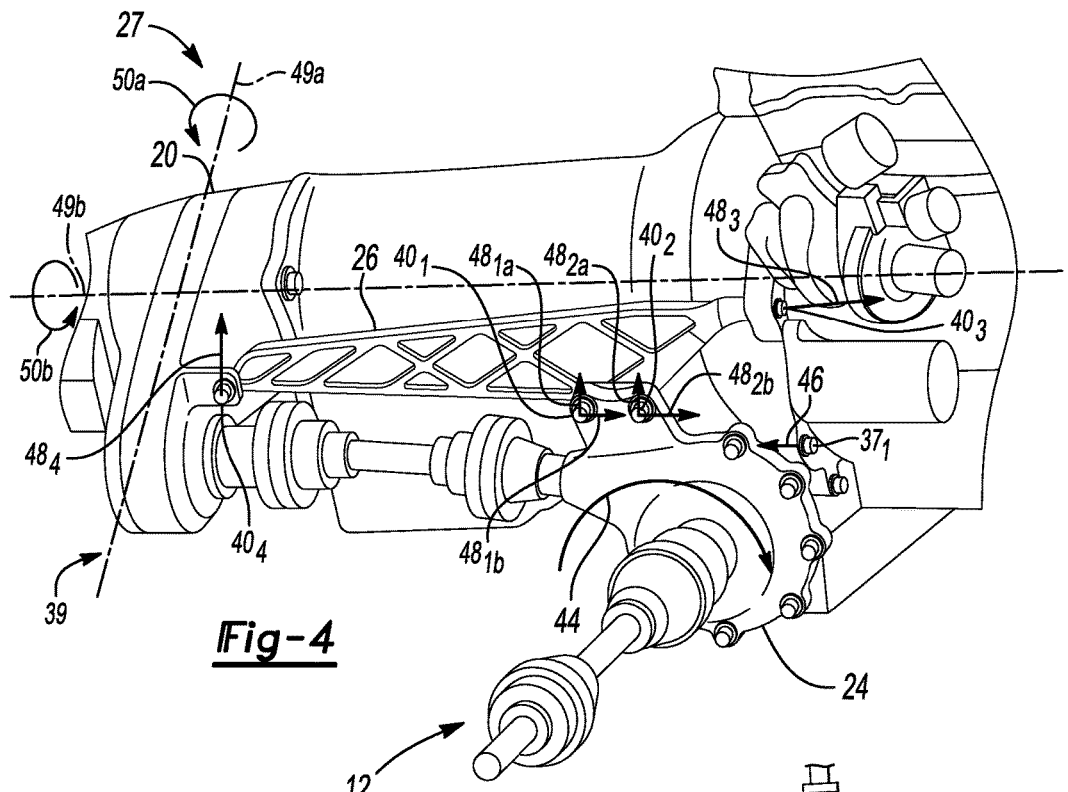
FIG. 4 is a lateral elevational view of the subassembly of FIG. 2 showing various forces experienced by the elements of the subassembly during operation.

FIG. 4 is a lateral elevational view of the subassembly 27 of FIG. 2 showing various forces experienced by the elements of the subassembly 27 during operation. During operation (in forward motion), front axle 12 may experience a clockwise moment (or torque) 44, which may be imparted (at least in part) on front axle housing 24. As such, transmission case 28 may experience a pulling force in direction 46 at each of its transmission mounting points $37_1$, $37_2$, $37_3$, $37_4$ (FIG. 3). Brace 26 may be used to counteract moment 44 and to stabilize powerplant system 39 such that relative motion between front axle housing 24, transfer case 20, and transmission case 28 is decreased. Specifically, by being mounted to transfer case 20, to front axle housing 24, and to transmission case 28, brace 26 may experience forces $48_{1a}$, $48_{1b}$, $48_{2a}$, $48_{2b}$, $48_3$, $48_4$ at intermediate mounting points $40_1$, $40_2$, front mounting point $40_3$, and rear mounting point $40_4$ as generally shown in FIG. 4.

Furthermore, by coupling brace 26 to front axle housing 24, transfer case 20, and transmission case 28 to form powerplant system 39, powertrain 11 may experience an increase in a bending frequency and a stiffness (which may be linearly related to bending frequency), which improves NVH. Specifically, brace 26 may be configured or have a predefined form such that a bending frequency of the powerplant system 39 falls within a predefined range, which may vary depending on the vehicle and manufacturer requirements and the weight and maximum speed of the vehicle. In some embodiments, the predefined range may be an open-ended range that includes any frequency greater than or equal to a frequency that is 10-30% above the maximum excitation frequency at maximum vehicle speed (for example and without limitation, greater than or equal to 700 Hz). In other embodiments, the predefined range may be a lower frequency range that avoids aggregation and resonance with other surrounding frequencies (for example and without limitation, 520-670 Hz or 400-450 Hz). In addition, brace 26 may minimize dynamic motion among the elements of the powertrain 11, control wind-up (torque) of the transfer case 20, and minimize drive line angle impact.

In some embodiments, powerplant bending frequency may be considered to be the first or lowest fundamental bending mode associated with the powerplant system 39; there may be a lateral mode and a vertical mode. Inclusion of brace 26 in the powerplant may improve upon both modes. In one embodiment, inclusion of brace 26 in powerplant system 39 increases powerplant bending frequency (vertical mode) by 10-15 Hz.

To determine the bending frequency, a starting and stopping frequency may first be determined. In one embodiment, the stopping frequency may be equivalent to maximum vehicle speed, and the starting frequency may be 50 Hz below the stopping frequency. Next, the vehicle may be operated between the starting and stopping frequencies under road load conditions while accelerometer data is obtained at one or more location(s) (for example and without limitation, where transfer case 20 couples to transmission case 28, at a point along transmission case 28, and where transmission case 28 meets engine 16 proximate bell housing 32). Powerplant bending frequency may be the highest amplification of the vehicle response to the rotational unbalanced force and may be referred to as the "resonant frequency."

Figure 5:
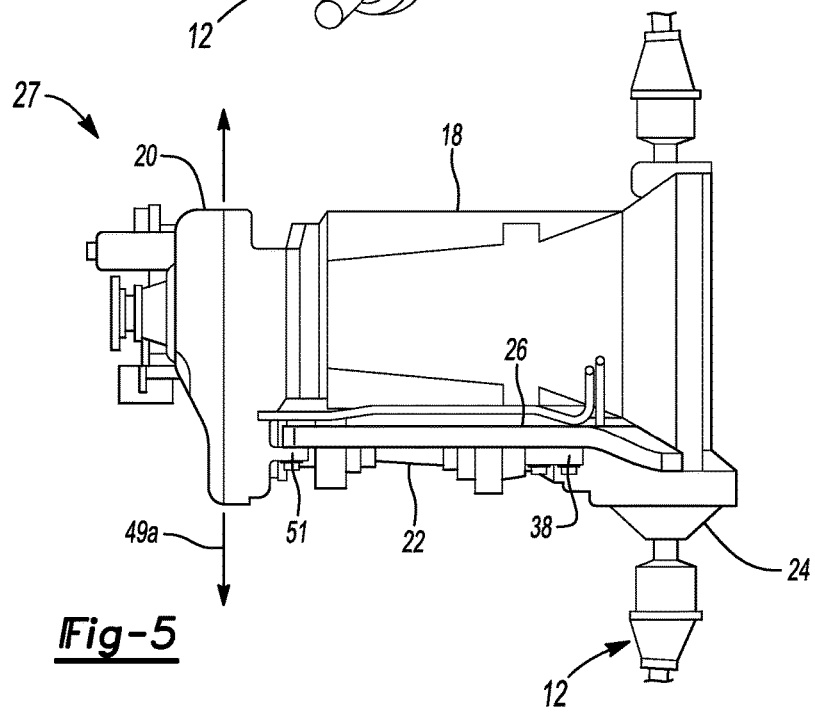
FIG. 5 is a top plan view of the subassembly of FIG. 2.

FIG. 5 is a top plan view of the subassembly 27 of FIG. 2. Due to the torques experienced by transmission 18, transfer case 20, front drive shaft 22, and front axle 12, transfer case 20 may experience vibrations along axis $49_a$. This phenomenon may be referred to in the industry as "chattering." To help reduce this chattering effect, brace 26 may be shaped similar to an I-beam (as will be described in more detail below). Transfer case 20 may also experience torsional bending (generally depicted as $50_a$ relative to axis $49_a$) due to a weight of transfer case 20 and powerplant bending (generally depicted as $50_b$) relative to a centerline $49_b$ of powertrain 11 due to the transfer of torque and speed through the powerplant system 39. Brace 26 may be configured to improve torsional bending $50_a$ and powerplant bending $50_b$. Moreover, although in the illustrated embodiment mounting flange 38 of front axle housing 24 and a mounting flange 51 of transfer case 20 are disposed laterally outwardly of brace 26, mounting flanges 38, 51 may be disposed laterally inwardly of brace 26. Furthermore, mounting flanges 38, 51 may be bifurcated (i.e., disposed laterally outwardly and inwardly of brace 26), such that brace 26 is sandwiched between each set of mounting flanges 38, 51.

Figures 6, 7:
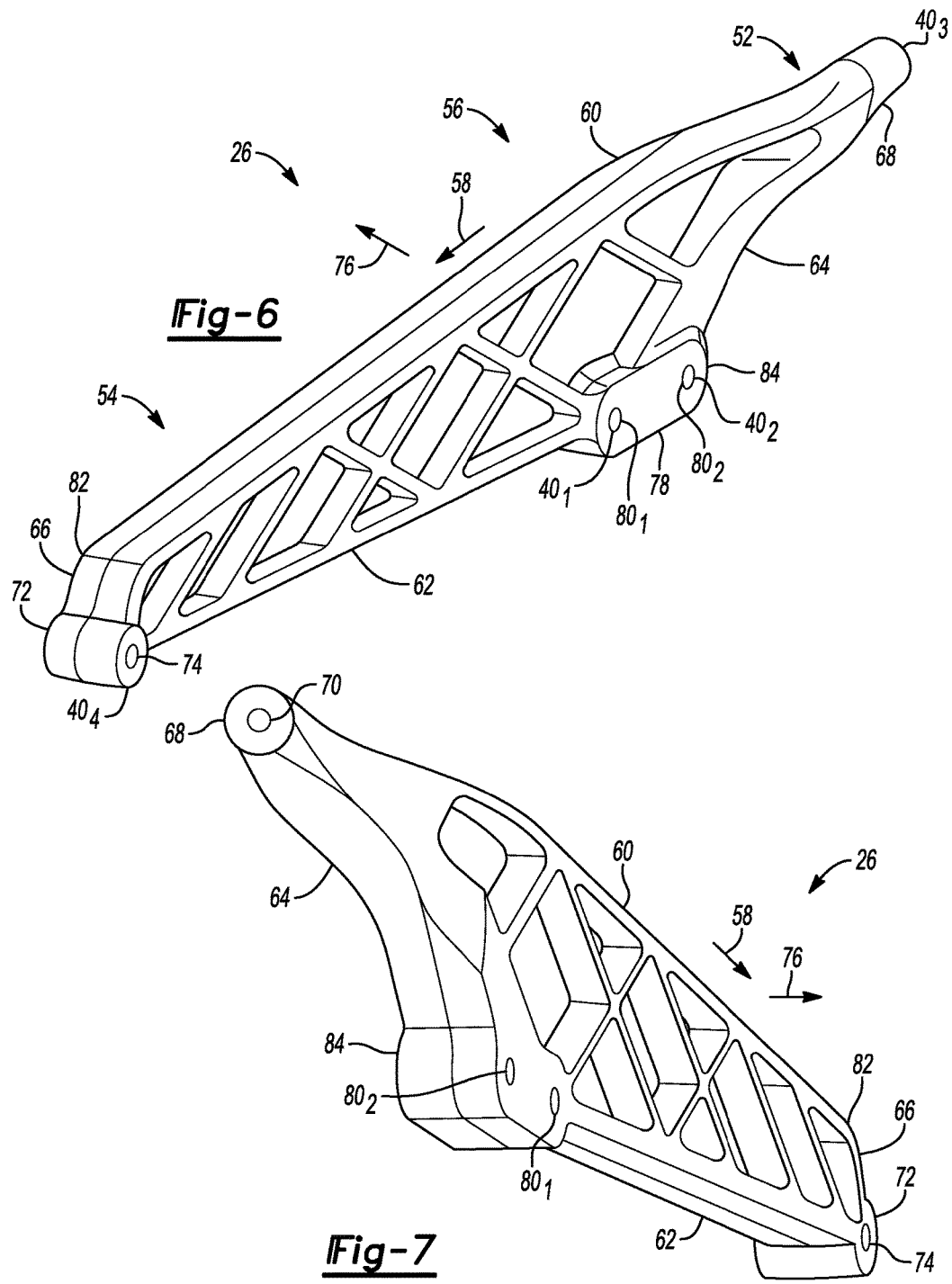
FIGS. 6-7 are isometric views of a brace of the subassembly of FIG. 2.

FIGS. 6-7 are isometric views of brace 26 of subassembly 27 of FIG. 2. In the illustrated embodiment, brace 26 is generally shaped like a blade. Referring particularly to FIG. 6, brace 26 may comprise a front portion 52, a rear portion 54, and an intermediate portion 56 between front portion 52 and rear portion 54. Front portion 52 of brace 26 may be directly fastened to bell housing 32 of transmission case 28 at front mounting point $40_3$; rear portion 54 of brace 26 may be directly fastened to front portion 36 of transfer case 20 at rear mounting point $40_4$; and intermediate portion 56 of brace 26 may be directly fastened to mounting flange 38 of front axle housing 24 at intermediate mounting points $40_1$, $40_2$ (elements surrounding brace 26 shown in FIG. 2). In the illustrated embodiment, front portion 52 of brace 26 may be curved to accommodate the shape of transmission case 28 (as best shown in FIG. 5). Apart from front portion 52, brace 26 may extend linearly in a longitudinal direction 58. One of ordinary skill in the art will understand that the brace may take on any number of shapes and curvatures to accommodate the shapes and sizes of the surrounding elements and to provide sufficient support and stability to the powerplant system 39.

Still referring to FIGS. 6-7, brace 26 may comprise a top surface 60, a bottom surface 62 opposite top surface 60, a front surface 64 extending between top surface 60 and bottom surface 62, and a rear surface 66 opposite front surface 64 and extending between top surface 60 and bottom surface 62. Front mounting point $40_3$ may be positioned proximate top surface 60, and rear mounting point $40_4$ and intermediate mounting points $40_1$, $40_2$ may be positioned proximate bottom surface 62. Top surface 60 and front surface 64 may come together to define a finger 68 extending in longitudinal direction 58. In one embodiment, finger 68 may comprise a blind hole 70 into which a fastening member, such as a bolt, may extend in longitudinal direction 58. Bottom surface 62 and rear surface 66 may come together to define a nose 72. In one embodiment, nose 72 may include a through-hole 74 extending in a traverse direction 76 (perpendicular to longitudinal direction 58) through which a fastening member may extend. Bottom surface 62 may extend linearly from nose 72 to intermediate portion 56. At intermediate portion 56, bottom surface 62 may protrude outwardly away from top surface 60 to form a shoulder 78. In one embodiment, shoulder 78 comprises two through-holes 80$_1$, 80$_2$ (each extending in traverse direction 76) through which fastening members may extend. Top surface 60 and rear surface 66 may come together to define a corner 82, and bottom surface 62 and front surface 64 may come together to define a front portion 84 of shoulder 78. One of ordinary skill in the art will understand that the brace may be fastened to the surrounding elements of powertrain 11 in various ways other than via the finger, nose, and shoulder.

Figure 8:
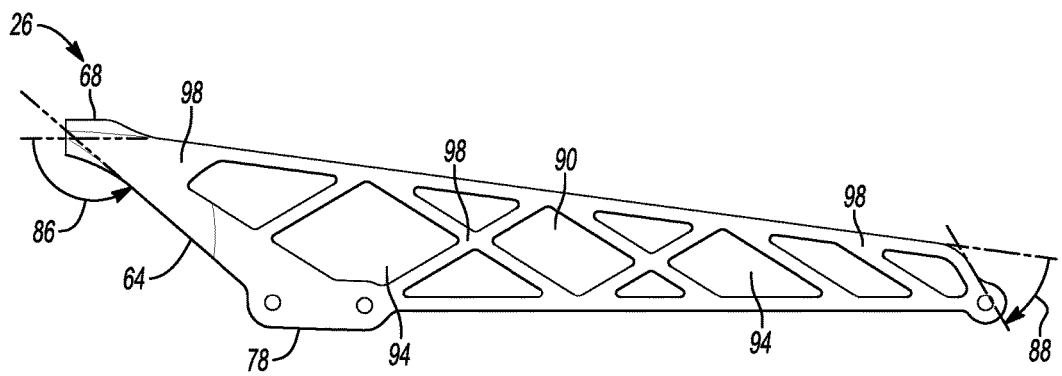
FIGS. 8-9 are lateral elevational views of the brace of FIG. 6.
Figure 9:
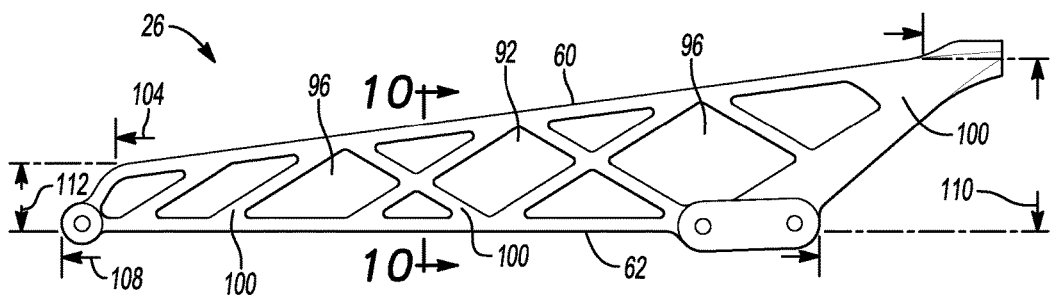

FIGS. 8-9 are lateral elevational views of brace 26 of subassembly 27 of FIG. 6. Referring particularly to FIG. 8, front surface 64 may extend from finger 68 to shoulder 78 at an angle 86 (relative to top surface 60) to accommodate the shape of transmission case 28. Rear surface 66 may extend at an angle 88 from corner 82 to nose 72 (relative to top surface 60). One of ordinary skill in the art will understand that the front surface and the rear surface of the brace may extend at various angles within the scope of this disclosure.

Figure 10:
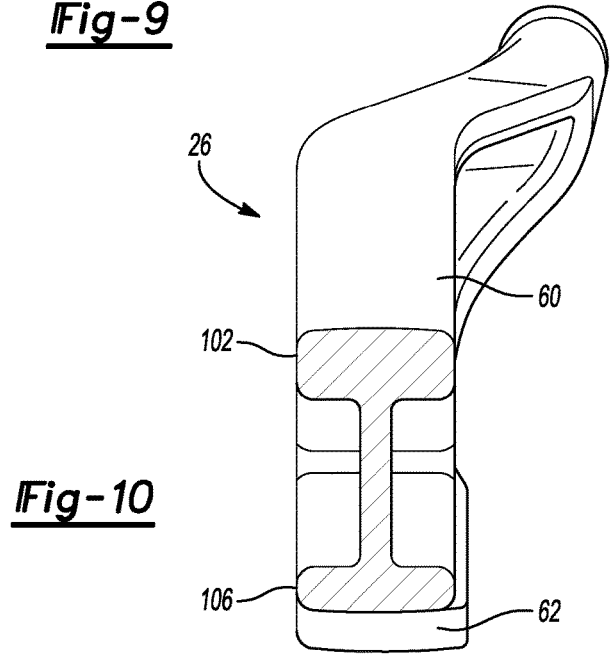
FIG. 10 is a cross-sectional view of the brace taken along line 10-10 of FIG. 9.

Still referring to FIGS. 8-9, brace 26 may further include a lateral side 90 facing transmission case 28 and a lateral side 92 opposite lateral side 90. Lateral sides 90, 92 may each include a base surface 94, 96 from which webbing 98, 100 protrudes. Webbing 98, 100 may increase stiffness to brace 26 and/or result in an increased bending frequency of the powerplant system 39. Moreover, at least a portion of webbing 98, 100 may include lines (intersecting and/or non-intersecting) that extend diagonally between top surface 60 and bottom surface 62. As best seen in FIG. 10, which is a cross-sectional view of the brace 26 taken along line 10-10 in FIG. 9, brace 26 may also include a top flange 102 that extends a majority of a length 104 of top surface 60 and a bottom flange 106 that extends a majority of a length 108 of bottom surface 62 (lengths 104, 108 shown in FIG. 9). Top flange 102 and bottom flange 106 may be configured to resist bending moments experienced by powerplant system 39 during operation of powertrain 11. Moreover, referring to FIG. 9, a front height 110 of brace 26 may be greater than a rear height 112 of brace 26 to maximize stiffness and/or bending frequency of the powerplant system 39.

While exemplary embodiments are described above, it is not intended that these embodiments describe all possible forms of the disclosure. Rather, the words used in the specification are words of description rather than limitation, and it is understood that various changes may be made without departing from the spirit and scope of the disclosure. Additionally, the features of various implementing embodiments may be combined to form further embodiments of the disclosure. Moreover, the phrase "directly fastened" as used in the specification is interpreted to encompass embodiments where an intermediary member, such as a shim, spacer, or weld, is disposed between the elements that are directly fastened to one another.

What is claimed is:

1. A powertrain comprising:
   a transmission case;
   a transfer case directly fastened to the transmission case;
   a front axle housing directly fastened to the transmission case; and
   a webbed brace directly fastened to the transmission case, the transfer case, and the front axle housing to form a powerplant system, and being configured such that a bending frequency of the powerplant system falls within a predefined range.

2. The powertrain of claim 1, wherein the webbed brace comprises a front portion directly fastened to the transmission case at a front mounting point, a rear portion directly fastened to the transfer case at a rear mounting point, and an intermediate portion between the front and rear portions, the intermediate portion being directly fastened to the front axle housing at an intermediate mounting point.

3. The powertrain of claim 2, wherein the webbed brace further comprises a top surface and a bottom surface opposite the top surface, and the front mounting point is positioned proximate the top surface.

4. The powertrain of claim 2, wherein the webbed brace further comprises a top surface and a bottom surface opposite the top surface, and the rear and intermediate mounting points are positioned proximate the bottom surface.

5. The powertrain of claim 1, wherein a front height of a front portion of the webbed brace is greater than a rear height of a rear portion of the webbed brace.

6. The powertrain of claim 1, further comprising a front drive shaft coupled to the transfer case, wherein the webbed brace is positioned adjacent the front drive shaft.

7. The powertrain of claim 1, wherein the webbed brace is directly fastened to a front portion of the transfer case and to a bell housing of the transmission case.

8. The powertrain of claim 1, wherein the webbed brace comprises a first lateral side and a second lateral side opposite the first lateral side, and the first and second lateral sides each include a base surface from which webbing protrudes.

9. The powertrain of claim 8, wherein at least a portion of the webbing of the first and second lateral sides includes lines that extend diagonally between a top surface and a bottom surface of the webbed brace.

10. The powertrain of claim 1, wherein the webbed brace further comprises:
    a top flange that extends a majority of a length of a top surface of the webbed brace; and
    a bottom flange that extends a majority of a length of a bottom surface of the webbed brace,
    wherein the top and bottom flanges of the webbed brace are configured to resist bending moments experienced by the powerplant system during operation of the powertrain.

11. The powertrain of claim 1, wherein the webbed brace is positioned laterally of the transmission case and spans a majority of a length of the transmission case.

12. The powertrain of claim 1, wherein the front axle housing is positioned proximate a front portion of the transmission case.

13. A powertrain comprising:
    a transmission case;
    a front axle housing directly fastened to the transmission case;
    a transfer case directly fastened to the transmission case; and
    a brace directly fastened to the transmission case and the transfer case to form a powerplant system, and having a predefined form such that a bending frequency of the powerplant system falls within a predefined range.

14. The powertrain of claim 13, wherein the brace comprises a front portion directly fastened to the transmission case at a front mounting point, a rear portion directly fastened to the transfer case at a rear mounting point, and an intermediate portion between the front and rear portions, the intermediate portion being directly fastened to the front axle housing at an intermediate mounting point.

15. The powertrain of claim 13, wherein a front height of a front portion of the brace is greater than a rear height of a rear portion of the brace.

16. The powertrain of claim 13, wherein the brace further comprises:
   a top flange that extends a majority of a length of a top surface of the brace; and
   a bottom flange that extends a majority of a length of a bottom surface of the brace,
   wherein the top and bottom flanges of the brace are configured to resist bending moments experienced by the powerplant system during operation of the powertrain.

17. A powertrain comprising:
   a transmission case;
   a transfer case directly fastened to the transmission case;
   a front axle housing directly fastened to the transmission case; and
   a brace directly fastened to the transmission case, the transfer case, and the front axle housing to increase a stiffness and a frequency of the powertrain.

18. The powertrain of claim 17, wherein the brace comprises a front portion directly fastened to the transmission case at a front mounting point, a rear portion directly fastened to the transfer case at a rear mounting point, and an intermediate portion between the front and rear portions, the intermediate portion being directly fastened to the front axle housing at an intermediate mounting point.

19. The powertrain of claim 17, wherein the brace comprises a first lateral side and a second lateral side opposite the first lateral side, and the first and second lateral sides each include a base surface from which webbing protrudes.

* * * * *